United States Patent [19]
Jones

[11] Patent Number: 5,212,385
[45] Date of Patent: May 18, 1993

[54] DIAMOND α PARTICLE DETECTOR

[76] Inventor: Barbara L. Jones, 80 Chisbury Close, Forest Park, Bracknell RG12 3TX, England

[21] Appl. No.: 747,267

[22] Filed: Aug. 19, 1991

[30] Foreign Application Priority Data

Aug. 17, 1990 [GB] United Kingdom ............... 9018138

[51] Int. Cl.⁵ ................ H01L 31/06; H01L 31/118; G01T 1/16
[52] U.S. Cl. .......................... 250/370.01; 250/370.07
[58] Field of Search ...................... 250/370.01, 370.07

[56] References Cited

U.S. PATENT DOCUMENTS 5,097,133 3/1992 Nam et al. .................. 250/370.01

Primary Examiner—Constantine Hannaher
Attorney, Agent, or Firm—Scully, Scott, Murphy & Presser

[57] ABSTRACT

A radiation detector element which is optimized for the detection of α particles comprises a layer of diamond or diamond-like carbon with first and second electrical contacts applied to the surface of the layer. The layer is formed on a silicon substrate, together with an electronic circuit. Each of the contacts defines a rectifying junction with the layer, thus defining a back-to-back diodic structure, having junction characteristics which are responsive to the intensity of radiation incident on the detector element. The electronic circuit is powered by a battery or a solar cell, and activates an LCD indicator if the intensity of the incident radiation exceeds a predetermined level. The radiation detector element and the electronic circuit are housed on a card which is sized similarly to a conventional identification card.

16 Claims, 3 Drawing Sheets ered as illustrated in FIG.

DIAMOND α PARTICLE DETECTOR

BACKGROUND OF THE INVENTION

This invention relates to a radiation detector element and to a radiation detector including the detector element, which is particularly sensitive to α radiation.

SUMMARY OF THE INVENTION

According to the invention a radiation detector element comprises a layer of diamond or diamond-like carbon with first and second electrical contacts applied thereto, at least one of the contacts defining a rectifying junction with the diamond or diamond-like carbon layer, the junction characteristics being responsive to the intensity of radiation incident on the detector element.

Preferably, both contacts define rectifying junctions with the diamond-like carbon layer, so that the detector defines a back-to-back diodic structure.

Preferably, the thickness of the diamond or diamond-like carbon layer is optimised for the detection of α particles.

The resulting detector is particularly sensitive to α particles, but can also be used to detect β and γ particles and X-rays.

The diamond or diamond-like carbon layer is preferably formed by a chemical vapour deposition (CVD) process.

The diamond or diamond-like carbon layer is preferably deposited on a supporting substrate, such as a layer of silicon.

Further according to the invention, a radiation detector includes the above detector element, and an electronic circuit connected electrically to the radiation detector element and arranged to apply a bias voltage to the electrical contacts thereof, and to measure the response of the radiation detector element to incident radiation.

The electronic circuit may be adapted to reverse bias the rectifying junction or junctions, and to sense variations in the junction characteristics due to radiation incident on the detector element.

Preferably, the electronic circuit is adapted to monitor the breakdown voltage of the junction or junctions.

The radiation detector may include a power supply element for powering the electronic circuit, and an indicator element responsive to an output signal of the circuit to provide an indication to a user of the detector when the intensity of radiation incident on the detector element reaches a predetermined level.

DESCRIPTION OF AN EMBODIMENT

Figure 1:
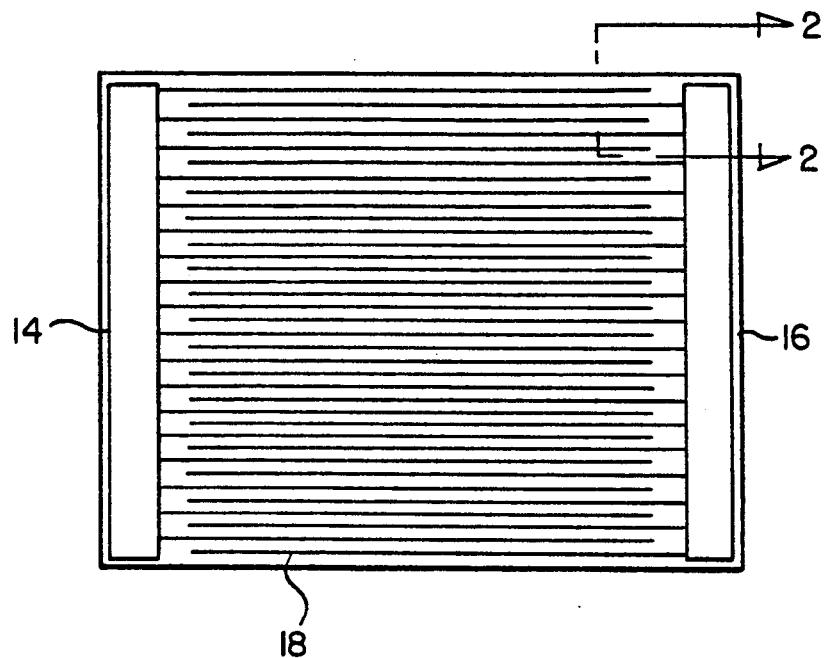
FIG. 1 is a schematic top view of a radiation detector element according to the invention.
Figure 2:
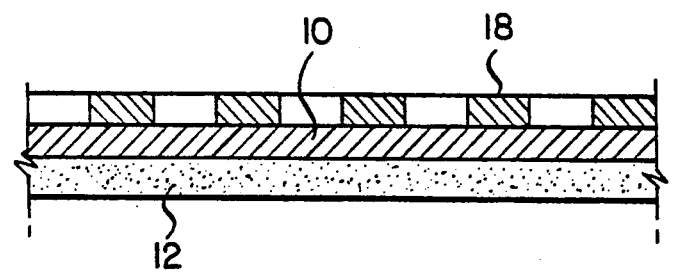
FIG. 2 is a section on the line 2—2 in FIG. 1.

The radiation detector element illustrated in FIGS. 1 to 2 comprises a layer 10 of diamond-like carbon film of very high resistivity, deposited on a silicon substrate 12.

The diamond-like layer 10 typically has a thickness of 0.3 μm and covers an area 10 mm by 10 mm. The film 10 was produced by radio frequency chemical vapour deposition (RF CVD) using a mixture of equal quantities of methane and hydrogen gas. The resistivity of the film 10 was measured at approximately $10^{10} \Omega cm$.

Deposited on the surface of the diamond-like carbon layer 10 are a pair of aluminium electrodes 14 and 16. Each electrode 14, 16 defines twenty four elongate fingers 18 which are interdigitated as illustrated in FIG. 1. The width of each finger 18 is approximately 250 μm, while the spacing between adjacent fingers 18 is also approximately 250 μm. Thus, approximately half of the surface of the diamond-like carbon layer 10 is exposed.

Figure 3:
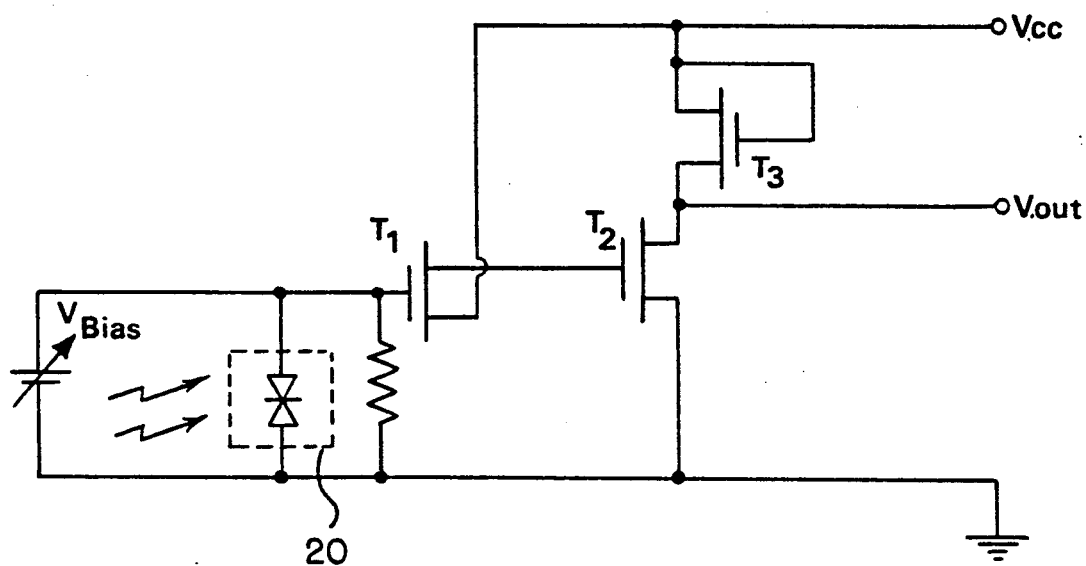
FIG. 3 is a schematic circuit diagram of electronic circuitry for use with the detector element of FIGS. 1 to 2.
Figure 4:
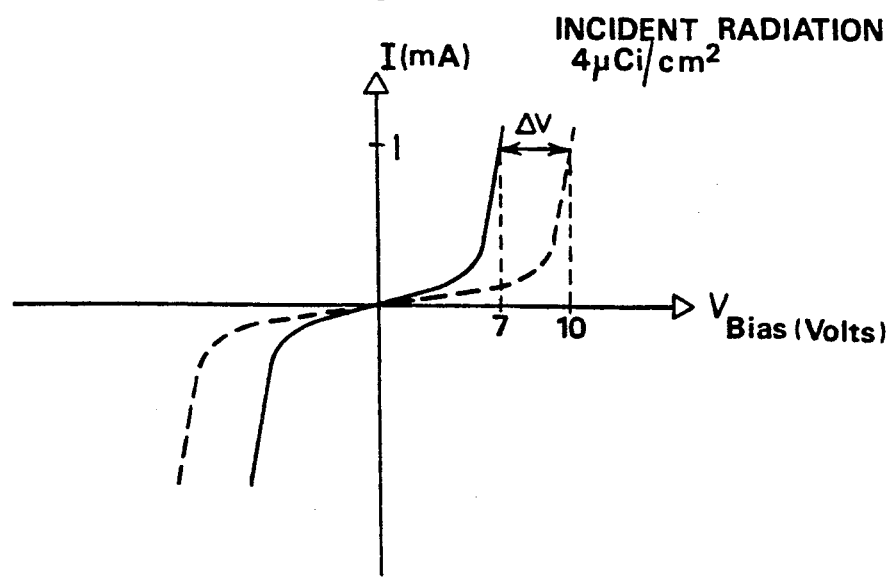
FIG. 4 is a graph illustrating electrical characteristics of the detector element in use.

The aluminium contacts 14 and 16 form diodic rectifying junctions with the diamond-like carbon layer 10. Thus, the detector element effectively defines a back-to-back diode between the contacts 14 and 16. FIG. 3 illustrates the detector element, indicated by the reference numeral 20, connected to an electronic circuit which is adapted to apply a DC bias voltage to the detector element and to measure variations in the characteristics of the diodic structure due to nuclear radiation incident on the detector element. Due to the back-to-back diodic structure both junctions will experience a similar voltage breakdown. The electronic circuit comprises a first MOS transistor T1 which acts as an amplifier responsive to the change ΔV in the breakdown voltage of the back-to-back diodes when the sensor is subject to radiation. A pair of MOS transistors T2 and T3 are connected as an inverter which inverts the output of the amplifier T1, so that an increase in radiation intensity results in an increase in the output voltage $V_{OUT}$ of the circuit.

The described detector arrangement was tested using an $Am^{241}$ source, which provides α particles having an energy of approximately 5 MeV. The activity of the source was approximately $7.4 \times 10^6$ disintegrations per second.

The prototype device was tested to have a breakdown voltage of 10 volts with no radiation incident on the detector element. With an incident radiation level of 4 μCi/cm², the breakdown voltage was 7 volts, while with an incident radiation level of 400 μCi/cm², the breakdown voltage was measured at 1 volt. The effect was reversible, with the breakdown voltage increasing to its original value on removal of the radioactive source. The mechanism by which the breakdown voltage of the diodes is reduced is believed to be due to the creation of electron/hole pairs in the diamond-like carbon layer due to the incident α radiation.

The described detector element can be expected to respond to β radiation and X-rays, as well as α radiation. In the case of β particles, the device will be less efficient than is the case with α particles, due to the thinness of the diamond-like carbon film presenting a relatively small collision cross section to the β particles. For the same reason, the device would not be expected to detect γ particles efficiently.

The chemical vapour deposition technology used to create the diamond-like carbon film can be used to produce relatively large detector elements, for example, having a size approximately equivalent to an A4 page, which would be useful in X-ray imaging applications. In such an application, the detector element can be formed as a multi-pixel type screen, with individual contacts to each pixel which would be connected to a multiplexing system and scanned to obtain imaging information, which could then be displayed on a video screen.

A number of variations of the device are possible. For example, instead of silicon, the support layer 12 can comprise metal, glass or silicon nitride. The layer 10 can comprise a film of insulating diamond material. The metal of the contacts 14 and 16 need not be aluminium, but can be another metal which makes a rectifying contact with the diamond-like carbon film, such as titanium, palladium, platinum or gold. Instead of applying metallic contacts directly to the surface of the diamond or diamond-like carbon layer 10, rectifying contact zones can, for example, be created by depositing suitably doped semiconductor material onto designated contact areas of the layer 10, with further metallic contacts applied thereto. Although a back-to-back diodic structure is described, a single-diode structure could also be used. However, a dual diode structure provides a larger depletion area in the detector element, which improves the sensitivity of the device.

Ideally, the radiation detector element and the associated electronic circuitry illustrated in FIG. 3 are fabricated on a single silicon wafer, providing a compact structure with a low sensitivity to noise.

Figure 5:
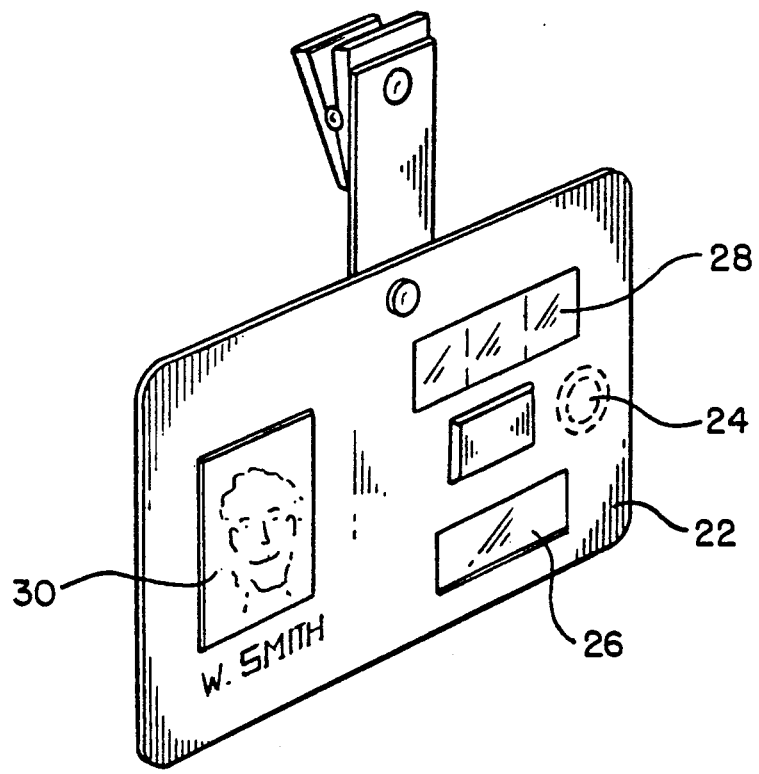
FIG. 5 is a pictorial view of a practical embodiment of a radiation detector according to the invention.

Such a device can then be incorporated, for example, in a personal tag or card to be worn by personnel who are exposed to α radiation, as illustrated in FIG. 5. Such a personal radiation detector is formed on a plastics card-like substrate 22, and includes a power supply in the form of a miniature battery such as a mercury button cell 24, and an indicator such as a liquid crystal display (LCD) element 26 to warn a user of the detector when a predetermined level of incident radiation is exceeded. Instead of a battery, or in addition to the battery, a solar cell 28 can be used to power the circuitry. Finally, the detector includes a photograph 30 of the person to whom it is issued. The detector can include circuitry to record the peak or average levels of radiation which it has detected. A typical application of the described α detector is in the detection of radon gas.

I claim:

1. A radiation detector element comprising a layer of diamond or diamond-like carbon with first and second electrical contacts applied thereto, with at least one of the contacts defining a rectifying junction with the diamond or diamond-like carbon layer which is responsive to the intensity of radiation incident on the detector element.

2. A radiation detector element according to claim 1 wherein both first and second electrical contacts define rectifying junctions with the diamond or diamond-like carbon layer in a back-to-back diodic structure.

3. A radiation detector element according to claim 1 wherein the thickness of the diamond or diamond-like carbon layer is optimised for the detection of α particles.

4. A radiation detector element according to claim 1 wherein the diamond or diamond-like carbon layer is a chemical vapour deposition layer.

5. A radiation detector element according to claim 4 including a supporting substrate on which the diamond or diamond-like carbon layer is deposited.

6. A radiation detector element according to claim 5 wherein the supporting substrate comprises silicon.

7. A radiation detector element according to claim 6 wherein the supporting substrate is a silicon chip or wafer on which an electronic circuit is formed.

8. A radiation detector comprising a radiation detector element according to claim 1, and an electronic circuit means connected electrically to the radiation detector element for applying a bias voltage to the electrical contacts thereof, and for measuring the response of the radiation detector element to incident radiation.

9. A radiation detector according to claim 8 wherein the electronic circuit means reverse biases at least one of the rectifying junctions, and detects variations in the junction characteristics due to radiation incident on the detector element.

10. A radiation detector according to claim 9 wherein the electronic circuit means monitors the reverse breakdown voltage of the junction or junctions.

11. A radiation detector according to claim 8 wherein the electronic circuit means provides an analog output voltage which varies in accordance with the intensity of radiation incident on the detector element.

12. A radiation detector according to claim 8 including a power supply means for powering the electronic circuit, and an indicator means responsive to an output signal of the circuit for providing an indication to a user of the detector when the intensity of radiation incident on the detector element reaches a predetermined level.

13. A radiation detector according to claim 12 wherein the power supply means is a battery.

14. A radiation detector according to claim 12 wherein the power supply means is a solar cell.

15. A radiation detector according to claim 12 including a card-like substrate on which the radiation detector element is formed.

16. A radiation detector according to claim 1 including a single silicon wafer on which an electronic circuit, electrically coupled to the radiation detector element, and the radiation detector element are fabricated.

* * * * *